US008625757B1

(12) United States Patent
Karpov et al.

(10) Patent No.: US 8,625,757 B1
(45) Date of Patent: Jan. 7, 2014

(54) MONITORING SERVICES AND SERVICE CONSUMERS

(75) Inventors: Alexandre Karpov, Seattle, WA (US); Darin Keith McAdams, Seattle, WA (US); Jonathan Kozolchyk, Seattle, WA (US); Peter S Ding, Seattle, WA (US); Jeffrey J Fielding, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 105 days.

(21) Appl. No.: 13/168,747

(22) Filed: Jun. 24, 2011

(51) Int. Cl.
*H04M 15/00* (2006.01)
(52) U.S. Cl.
USPC .............................. 379/112.06; 379/112.03
(58) Field of Classification Search
USPC .............. 379/112.03, 112.05, 112.06; 705/10
See application file for complete search history.

(56) References Cited

U.S. PATENT DOCUMENTS

| 7,783,745 B1* | 8/2010 | Bhargava et al. ............ 709/224 |
| 2005/0143956 A1* | 6/2005 | Long et al. ................... 702/184 |
| 2005/0216241 A1* | 9/2005 | Entin et al. ....................... 703/2 |

* cited by examiner

*Primary Examiner* — Quoc D Tran
(74) *Attorney, Agent, or Firm* — Lee & Hayes, PLLC

(57) ABSTRACT

A monitoring service may receive, from a plurality of service providers, log information pertaining to access calls made by service consumers to services or APIs provided by the service providers. The monitoring service aggregates and analyzes the log information for use in monitoring performance of the services, identifying anomalies, and the like. In some instances, the monitoring service may identify multiple services that are behaviorally interrelated based on at least one performance metric, and may group these services together into service groups for monitoring purposes. A service relationship model may be generated for each of the service groups that predicts how each service will behave relative to the other services in the service group. The monitoring service may monitor performance and use of the services based, at least in part, on the one or more service groups and the service relationship model for each group.

21 Claims, 11 Drawing Sheets

MONITORING SERVICES AND SERVICE CONSUMERS

BACKGROUND

Some types of businesses or enterprises may use a number of applications that interact with one another to carry out functions connected with enterprise activities. Thus, some of these applications provide services that are utilized by other applications employed by the enterprise. These internal services are often provided to the other applications as part of an enterprise's business operations. Further, because internal services are typically provided within an enterprise's own network, intranet, or the like, interactions are often assumed to be secure. Consequently, the provision and consumption of internal services may not always be well monitored, which can affect the enterprise's efficiency and security.

Additionally, some internal services may be used by many different service consumers for many different purposes, and internal services tend to change or evolve at a faster rate than public services. Thus, internal service providers may not be able to easily monitor how their services are performing, how their services are being used, who is using their services, or how ongoing changes in their services affect users and overall security concerns. Further, on the other side, the applications of service consumers may not always receive their requested services in a timely manner due to latency or interrupts at the service providers. However, the causes of such latencies or interrupts are not always easy to identify.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Monitoring Services and Service Consumers

Figure 1:
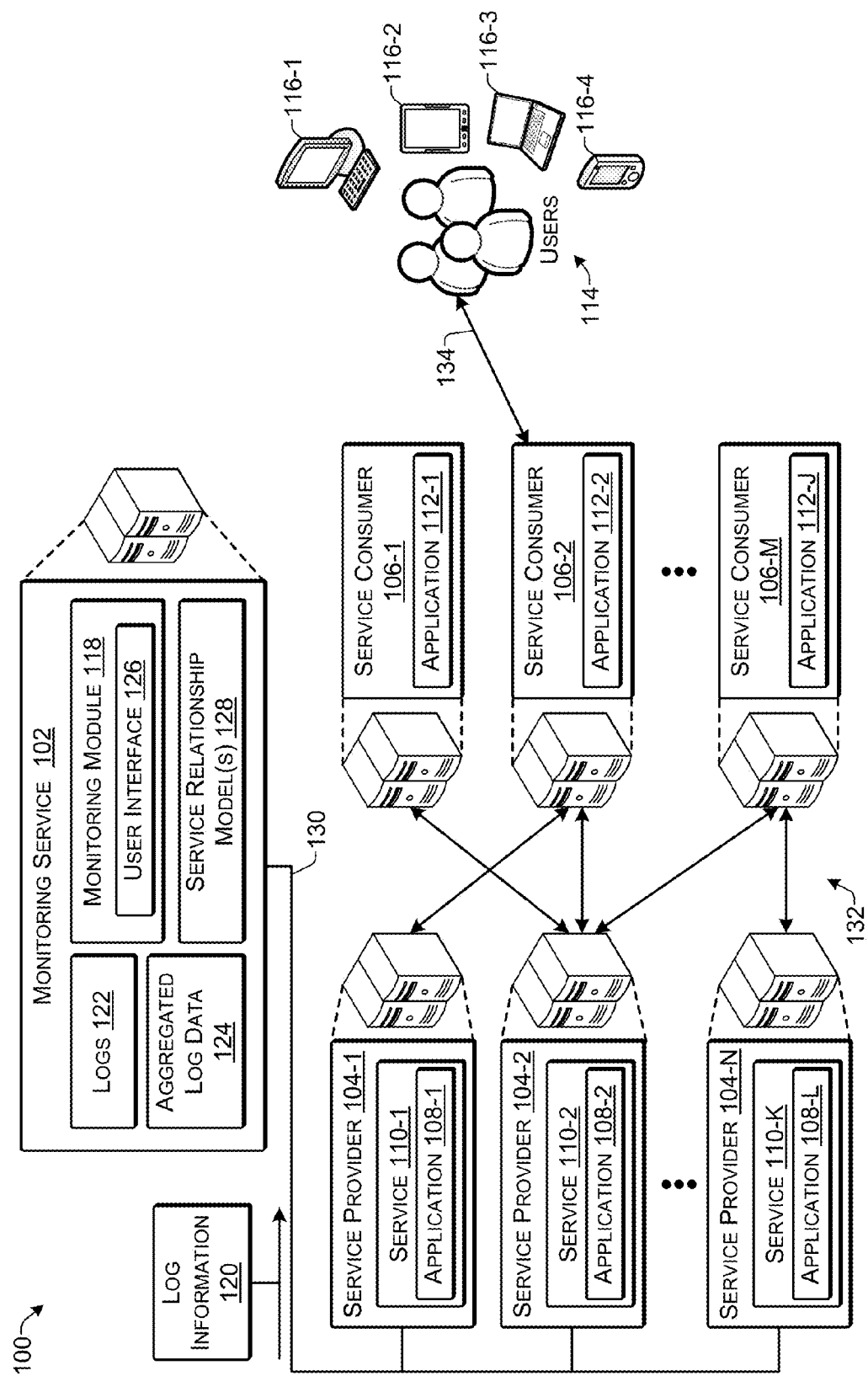
FIG. 1 illustrates an example architecture of a system for monitoring services and service consumers according to some implementations.

This disclosure includes techniques and arrangements for monitoring services and service consumers. In some implementations, a monitoring service may receive copies of log data pertaining to a plurality of services. The log data may include details of service requests or calls made to the services by the service consumers, such as calls made to one or more application programming interfaces (APIs) provided by each service. For example, the monitoring service herein can receive log information from each service and maintain log files pertaining to service consumer usage of each service. The monitoring service may perform aggregation and analysis on the logs to determine various types of information pertaining to performance of the services and usage of the services by service consumers. For example, information that may be determined regarding the performance of the services may include latency times in responding to calls from service consumers, average latency times for a service, which service consumers may have contributed to an increase in latency or call volume, peak call volumes, size of outgoing data, average number of calls over a period of time, number of calls at different times of day or during different days of the week, and the like. Information that may be determined regarding the service consumers may include the identity of each service consumer that called each service, how many times each service consumer called each service, latencies for each service consumer in receiving responses to each call, changes in latency experienced by various service consumers, changes in timeouts experienced by various service consumers, aggregate change in performance over a period of time, and the like. The aggregated log information may be rendered for display and/or monitored for detecting abnormal call volumes or latencies, access anomalies, security breaches, excessive usage of a service by a service consumer, and the like. For example, the monitoring service may issue an alert to a service provider when usage anomalies are detected and/or take direct action to address a detected anomaly.

In some implementations, a user interface may display the aggregated information extracted from the log data. For example, the aggregated log information may be rendered in graphical form for viewing by an administrator at the monitoring service or at a service provider. For instance, the user interface may display various types of information such as which service consumers called a particular service most often, which service consumers consumed the most service time over a particular time window, which service consumers may have contributed to an increase in latency times for a particular service, and the like. Further, the aggregated log information may be automatically analyzed using analysis techniques to detect anomalies or other problems. For example, for each service, call volume and several different types of latencies may be monitored, e.g., the amount of time to respond to each request, the average amount of time to respond to a plurality of requests, the amount of time required to respond to a certain percentage of the requests, and so forth. Furthermore, in some implementations, the aggregated log information for each service may be provided directly to the corresponding service provider of that service to enable the service provider to view, analyze and/or address any issues presented by the aggregated log information for that service.

Some implementations may establish a one or more service relationships for detecting abnormalities, excessive service consumer usage, or the like. For example, some or all of the service applications for the enterprise may be observed over a first period of time to detect which services are interrelated to one another based on utilization or behavior patterns of the services with respect to one or more performance metrics. For example, based on global observation of the relative performances of all services, the monitoring service can identify one or more subsets of services that are interdependent or behaviorally related to one another. Based on this observed behavior, the monitoring service creates one or more service groups from the plurality of services and each service group may be monitored for anomalies. Thus, each service group may be made up of a subset of the services that have been determined to have performance that is interrelated or codependent, at least in part, on performance of the other services in that group. As one example, when one of the services in a particular service group experiences an increase in traffic or an increase in latency, the other services in the group might also be expected to experience a similar increase in traffic or latency.

In addition, one or more service relationship models may be established for each of the subsets or groups of interrelated services based on the observed performance patterns. For example, the service relationship model may be a statistical model that predicts how each member of a particular service group will behave in response to performance of other members of the particular service group.

Following identification of the service groups and generation of the corresponding service relationship models, the services in each group may be monitored over subsequent time periods to determine whether the services in each group are performing in an expected manner, such as may be indicated by the service relationship models. As one example, spikes in service calls for some types of services may occur on a frequent basis. However, according to implementations herein, such spikes do not necessarily indicate an anomaly or a problem for concern when other services in the same group are also observed to spike in a similar manner. Consequently, some implementations enable avoidance of spurious alarms by using the service relationship models to determine whether a spike in call volume, latency, or other metric for a service is an anomaly that needs to be addressed, or merely part of normal enterprise operations, such as may be caused by a spike in real-world traffic.

Additionally, in some implementations, the user interface may provide an administrator at the monitoring service or at a service provider with the ability to address anomalies, detected security breaches, or excessive use of a service by a service consumer. For example, the user interface may enable implementation of a remedial action contingency or control to slow down overall traffic at a particular service or block one or more particular service consumers causing the anomaly. In some implementations, overall traffic may be slowed down using various techniques such as by implementing a captcha or asking a security question, thereby requiring human interaction from the service consumers for each call to a service. Additionally, in some implementations, the user interface may provide a single control that can be activated by a service provider or by the monitoring service to block calls received from a particular service consumer, thereby blocking the particular service consumer from accessing a particular service or multiple services. For example, the blocking of one or more selected service consumers may occur at the service level, such as when an anomaly or excessive usage is detected. In some implementations, a particular service consumer may be blocked from accessing a particular API when the rate at which the service consumer calls the API exceeds a predetermined threshold or quota established for the service consumer.

Example Architecture

FIG. 1 illustrates an example architecture of a system 100 that includes a monitoring service 102 for monitoring services and service consumers according to some implementations. The monitoring service 102 is able to communicate with a plurality of service providers 104-1, 104-2, ..., 104-N, which in turn, are able to communicate with a plurality of clients or service consumers 106-1, 106-2, ..., 106-M. For example, each service provider 104 may have one or more service provider applications 108-1, 108-2, ..., 108-L that provide one or more services 110-1, 110-2, ..., 110-K to one or more service consumer applications 112-1, 112-2, ..., 112-J at each service consumer 106. Furthermore, as will be explained additionally below, in some instances a service consumer 106 of one service 110 may itself be a service provider 104 of another service 110 to another service consumer 106. Thus, in some implementations, a single application may act in dual roles by being both a service provider application 108 that provides a service 110 to a service consumer 106, while also being a service consumer application 112 that utilizes a service 110 provided by another service provider 104.

Additionally, in some instances, one or more of the service consumers 106 may provide services to end users 114, such as internal users (e.g., employees of an enterprise) or external users such as customers, potential customers and other members of the public. For example, the users 114 may access one of the service consumers 106, such as service consumer 106-2, using any of a variety of devices, such as personal computers or workstations 116-1, e-book readers and tablet devices 116-2, laptop computers 116-3, cellular telephones and smart phones 116-4, or any other suitable devices. The service consumer 106-2 may access one or more service providers 104 when providing a service itself to the users 114. Thus, in some implementations, the service providers 104 may provide internal services to the service consumers 106, and one or more service consumers 106 may provide an external service to one or more users 114.

The monitoring service 102 may include a monitoring module 118 to perform the functions and features described herein for monitoring services and service consumers. For example, the monitoring module 118 may receive log information 120 from the service providers 104 for enabling monitoring of the services 110 and the service consumers 106 by the monitoring service 102. Thus, the monitoring service 102 may receive the log information 120 from each service 110 monitored by the monitoring service 102, and the received log information 120 may be stored in logs 122. For example, the logs 122 may be stored at the monitoring service 102 or at a remote location, such as on a storage array, network attached storage, storage area network, storage service, or the like. The information in the logs 122 may be subsequently aggregated and analyzed, as described additionally below, to generate aggregated log data 124 that is used during monitoring of the services and service consumers.

The monitoring module 118 may further include a user interface 126 that may be used by an administrator at the monitoring service 102 for performing functions in association with the monitoring. An instance of the user interface 126 may also be made available to one or more of the service providers 104 for enabling the service providers to view the aggregated log data for monitoring and managing their own services 110. The user interface 126 may provide the aggregated log data 124 for review by an authorized party, such as the administrator at the monitoring service, an administrator at one or more associated service providers 104, or other authorized third parties. Additional details and functions of the user interface 126 are discussed below.

The monitoring module 118 may automatically review and monitor the aggregated log data 124, such as by utilizing one or more service relationship models 128, which may be applied to identify any anomalies or use conditions that may warrant providing an alert to the administrator at the monitoring service or at a particular service provider. Furthermore, as described additionally below, the monitoring module 118 may also generate and continually refine the one or more service relationship models 128 for monitoring the actions and interactions of each service 110 and each service consumer 106. In some implementations, the one or more service relationship models 128 may be based on groupings of services that have performance metrics that are interrelated to one another, such as a plurality of APIs that show some performance metric interdependence or relationship.

The service providers 104 may communicate with the monitoring service 102 through one or more communication links 130; the service providers 104 may communicate with the service consumers 106 through one or more communication links 132; and the service consumers 106 may communicate with the users 114 through one or more communication links 134. Further, while not shown for clarity, the monitoring service 102, service providers 104, service consumers 106 and users 114 may all be able to communicate with one another through the various communication links. Each of these communication links 130, 132, 134 may be the same communication link or different communication links. For example, the communications links 130-134 may be any of a direct connection, a local area network (LAN), a wide area network (WAN), a virtual private network (VPN), or any combination thereof, and may include both wired and wireless communication technologies using any suitable protocols and communication techniques. In some implementations, the monitoring service 102, service providers 104 and service consumers 106 may be located at a data center, server farm or other single physical location, while in other implementations, the monitoring service 102, service providers 104, service consumers 106 and users 114 may be located in diverse and disparate locations that are physically remote from one another, and the communication links 130-134 may include the Internet or other long range communication network.

Example Roles and Relationships

Figure 2:
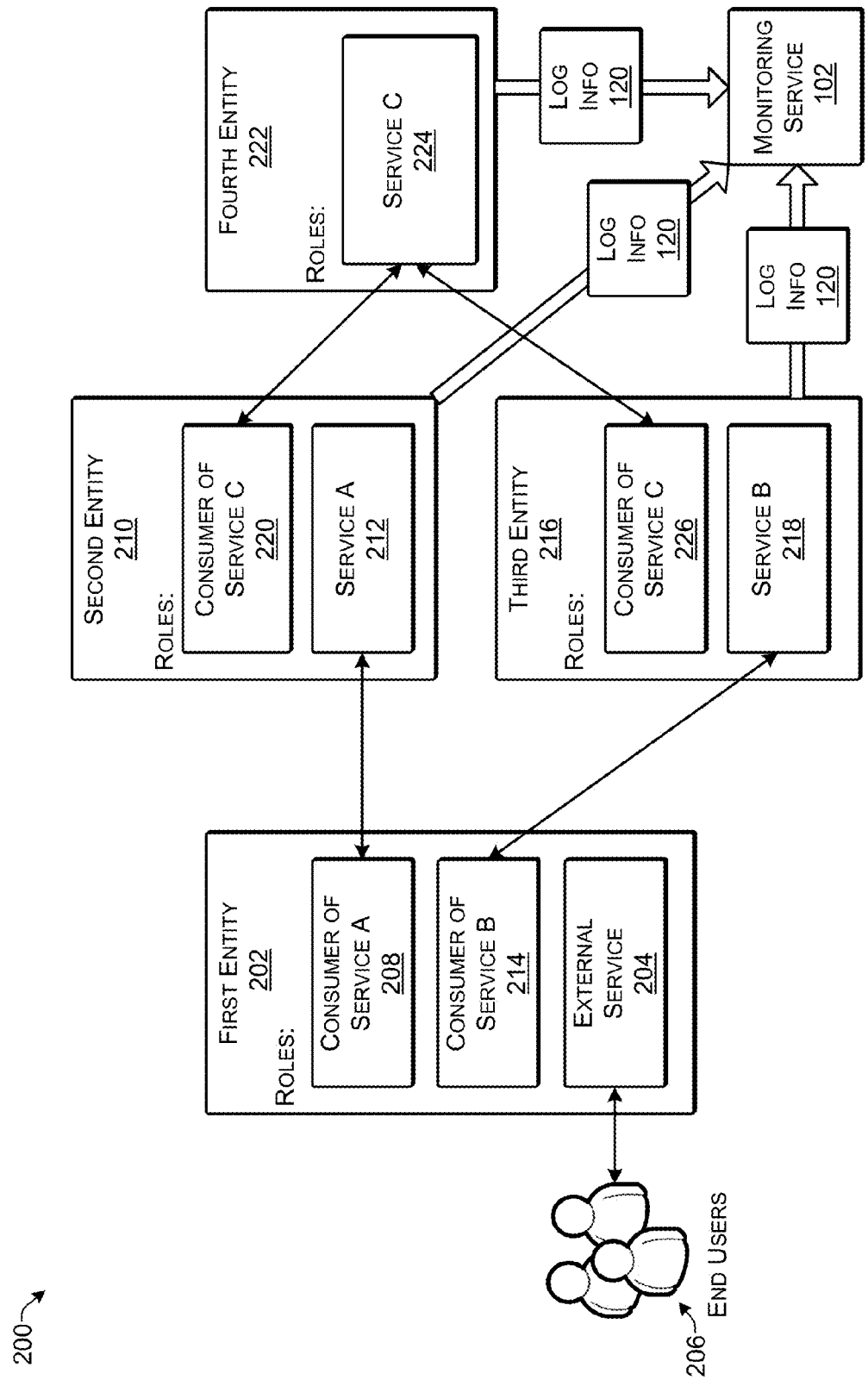
FIG. 2 illustrates an example of multiple entities engaging in multiple roles as service and/or client according to some implementations.

FIG. 2 is an example framework 200 illustrating how different entities may perform various different roles (e.g., service provider, service consumer (client) or both service provider and service consumer) according to some implementations. In this example, a first entity 202 may be a provider of an external service 204 to one or more end users 206, such as consumers, employees of an enterprise, or the like. In order to provide the external service 204, the first entity 202 may subscribe as a service consumer to a plurality of services. For instance, the first entity 202 may include a consumer of service A 208 as a service consumer that uses services provided by a second entity 210. For example, the second entity 210 may provide a service A 212 that, when called by the consumer of service A 208, provides information or other services to the consumer of service A 208. Further, the first entity 202 may also include a consumer of service B 214 as a service consumer that uses services provided by a third entity 216. For example, the third entity 216 may provide a service B 218 that provides services to the consumer of service B 214 at the first entity 202.

Furthermore, the second entity 210 may include a consumer of service C 220 as a service consumer that accesses services provided by a fourth entity 222, such as to enable the service A 212 to provide the service A to the consumer of service A 208. The fourth entity 222 may include a service C 224 that provides information or other services to the consumer of service C 220 to enable functionality of the service A 212. Similarly, the third entity 216 includes a consumer of service C 226 as a service consumer that obtains information or other services from the service C 224 of the fourth entity 222 for use by the service B 218 when providing the service B to the consumer of service B 214.

From this example, it will be apparent that certain entities or applications may adopt different roles as service consumer (client) and/or service provider during performance of their functions. Further, each of the services 212, 218 and 224 may communicate log information 120 to the monitoring service 102. For example, the services 212, 218 and 224 may provide log information 120 to the monitoring service 102 on a periodic basis, such as in a batch delivery, or may provide the log information 120 to the monitoring service 102 as the log information 120 is accumulated at each service 212, 218 and 224. Further, the example of FIG. 2 is just one nonlimiting example of the numerous types of service consumer and service interactions that may be monitored according to the implementations disclosed herein.

Example Service Groups and Service Relationship Models

Figure 3:
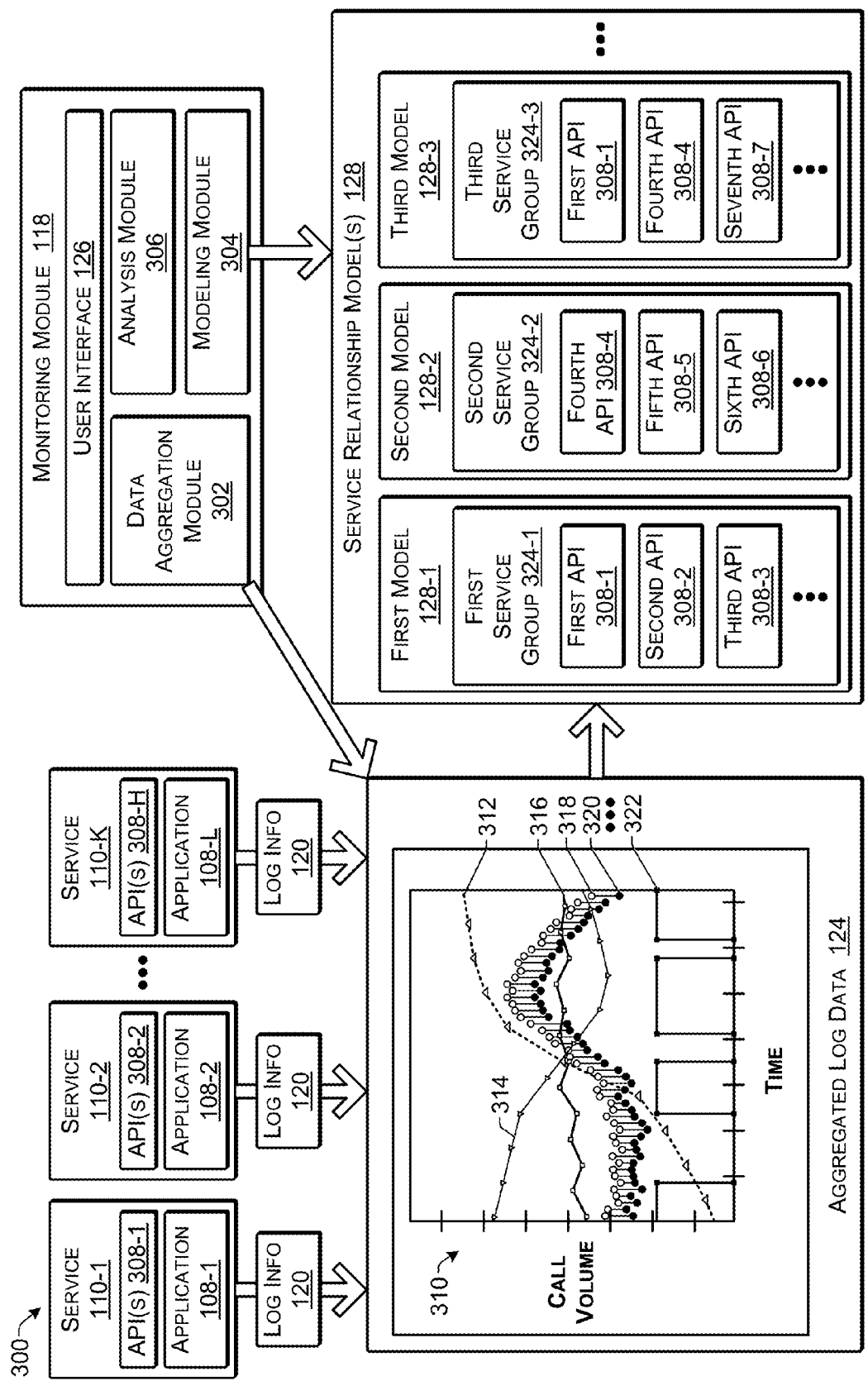
FIG. 3 illustrates an example framework for generating service relationship models from aggregated log data according to some implementations.

FIG. 3 illustrates an example framework 300 for identifying interrelated services and/or generating one or more service relationship models according to some implementations. The functions of the framework 300 may be executed by the monitoring module 118, as executed on one or more processors on one or more monitoring service computing devices, as described additionally below. For example, the monitoring module 118 may include a data aggregation module 302 that carries out the data aggregation to generate the aggregated log data 124. Furthermore, the monitoring module 118 may include a modeling module 304 to identify service groups and generate the service relationship models 128 based on an initial set of aggregated log data 124. Further, the modeling module 304 may periodically refine or update the service groups and/or service relationship models based on subsequent sets of aggregated log data 124. In addition, the monitoring module 118 may include an analysis module 306 for applying the service relationship models 128 to subsequent sets of aggregated log data 124 for performing the monitoring functions described herein.

Each of the services 110-1, 110-2, . . . , 110-K may include one or more respective APIs 308-1, 308-2, . . . , 308-H that may provide the associated services to service consumers when called by a service consumer application 112. Furthermore, each service 110 provides log information 120 that is aggregated by the data aggregation module 302 to generate aggregated log data 124. For example, the data aggregation module may aggregate received log data on at predetermined intervals, such as every minute, every five minutes, every ten minutes, etc. Numerous different types of aggregated log data 124 may be generated from the log information 120, such as call volume of each service as a function of time, latency of each service as a function of time, average latencies, number of cache hits, how many times each client called each service, and a comparison of the performance of one service with the performance of another service, to name a few nonlimiting examples. In some implementations, the data aggregation module 302 may be operated across a distributed computing system such as by using a map reduce process for aggregating the log data, or the like. Furthermore, the data aggregation module may aggregate the log data into the discrete intervals of time to determine the various metrics of the services and service consumers mentioned above.

Initially, in order to group the plurality of services 110 into subsets of interrelated services and/or generate the service relationship models 128, the monitoring module 118 may receive log information 120 from the plurality of the services 110 over a first period of time. The data aggregation module 302 may aggregate this log information to generate aggregated log data 124. In the example of FIG. 3, a plurality of service groups and service relationship models are generated based on call volume as a function of time, although service groups and/or service relationship models may be generated based on numerous other aspects of service metrics, such as response times, average latency, and so forth.

For example, each service 110 may receive calls from service consumers 106 to the one or APIs 308 provided by each service 110. This is generally referred to as call volume or traffic. Each service 110 generates log information 120 about the calls from each service consumer 106, and provides this log information 120 to the monitoring module 118. In the illustrated example, the data aggregation module 302 aggregates the call volume data from a plurality of services, as represented by graph 310 (although other suitable data structures may be used, depending at least in part on the metric being examined). In this example, each curve 312-322 in the graph 310 maps changes in the call volume of a different service 110 over time. Furthermore, while the curves of six different services are shown in the example of FIG. 3 for discussion purposes, in some implementations there may be several orders of magnitude greater number of services.

The modeling module 304 may apply statistical analysis to identify those services or particular APIs that demonstrate an interrelationship with respect to call volume. Services or particular APIs that are determined to be interrelated may be grouped into one or more service groups, such as a first service group 324-1, a second service group 324-2, a third service group 324-3, . . . , and so forth. For example if the call volume of a first service goes up when the call volume of a second service goes up, and likewise, goes down, when the call volume of the second service goes down, as demonstrated by curves 318 and 320, then those two services may be grouped together in a service group such as first service group 324-1. As another example, if the call volume of a first service goes down when the call volume of a second service goes up, and vice versa, those services might also be considered to be interrelated, as demonstrated for example, by curves 314 and 320 in the graph 310. As yet another example, as indicated by the curves 320 and 322, when a service receives call volumes for a longer period of time or at more frequent intervals, as indicated by curve 322, when another service goes up in call volume, as indicated by curve 320, then those services might also be considered interrelated. The modeling module may take these and other relationships into consideration when grouping the services into service groups 324, such as service groups 324-1, 324-2 and 324-3 in this example. Each of the service groups 324 may include identification of a plurality of services or APIs that have been identified by the modeling module 304 as being related to one another for purposes of monitoring call volume. Service groups may be similarly generated for other service metrics such as various types of latency or the like.

The modeling module 304 may generate a service relationship model 128 based on each of the service groups 324 that predicts how each API in each service group 324 will perform relative to the other APIs in the service group. For example, various statistical modeling techniques may be used to generate the service relationship models 128, examples of which may include regression models, Markov chain models, hidden Markov models, Bayesian models, or the like. The service relationship model 128 for each service group establishes statistical probabilities regarding predicted relative behaviors of members of the group with respect to one another for the relative performance metric.

As a simple example, suppose that a first service group 324 includes ten services, and observed behavior has shown that as the latency of one of the services increases, the latency of the other nine services increases generally proportionally, and as the latency of one of the services decreases, the latency of the other nine services also decreases generally proportionally. Accordingly, a service relationship model 128 may be generated for this service group 324 that predicts the proportional amount of change in latency expected for each service in the group in response to changes in latency of one or more of the other services in the group. The service relationship model may further include a predicted deviation from the observed changes for each member of the group 324 to account for variations in day-to-day operations of the services. Various other statistical modeling techniques may also be employed for generating the service relationship model. Further, while the foregoing provides a simple description of an example service relationship model, the service relationship models 128 may become substantially more complex when attempting to account for more unusual behaviors, such as those demonstrated by the curves 312, 314, 316, and 322, which may take into account inverse relationships, relate time of performance to quantity of performance, and so forth, or when a plurality of performance metrics are used to relate the services in a group to one another. Nevertheless, once generated, the service relationship model 128 for each service group 324 may be applied to subsequent aggregated log data 124 to predict whether a member of the service group 324 is out of range with respect to other members of the service group 324. When a determination is made that a member of a service group 324 is out of range, an alert may be provided to an administrator at the monitoring service or at the service provider itself.

Furthermore, the modeling module 304 may continually refine the service groups 324 and/or the service relationship models 128 as new log information 120 is received from the services 110. For example, if a first service 110-1 changes its algorithm so that it no longer shows a performance correspondence to other services in a particular service group related to a particular metric, then the modeling module 304 will subsequently remove the first service 110-1 from the particular service group, as there will no longer be sufficient statistical association between the performance of the first service 110-1 and the other services in the service group for the particular performance metric. Services may subsequently be added to service groups on inverse similar reasoning.

In the illustrated example of FIG. 3, the modeling module 304 has generated a first service relationship model 128-1 for the first service group 324-1, which includes at least the first API 308-1, the second API 308-2, and the third API 308-3. Similarly, a second service relationship model 128-2 for a second service group 324-2 includes at least a fourth API 308-4, a fifth API 308-5, and a sixth API 308-6. Further a third service relationship model 128-3 for a third service group 324-3 includes at least the first API 308-1, the fourth API 308-4, and a seventh API 308-7. Accordingly, the APIs 308 may be grouped into more than one service group 324, with a limitation being that they show a behavioral interrelationship with the other APIs included in that particular service group 324 for a particular service metric.

Following generation of the service relationship models 128, the analysis module 306 of the monitoring module 118 may apply the service relationship models 128 when performing analysis of subsequently received log information 120. For example, as new log information is received and aggregated by the data aggregation module 302, the log information for the APIs 308 of each service group 324 may be aggregated together to determine compliance with the service relationship model 128 for that service group 324. When a service relationship model 128 for a particular service group 324 indicates that a member of the service group 324 is out of range as compared to the other members of the service group 324, an alert may be issued.

Figure 4:
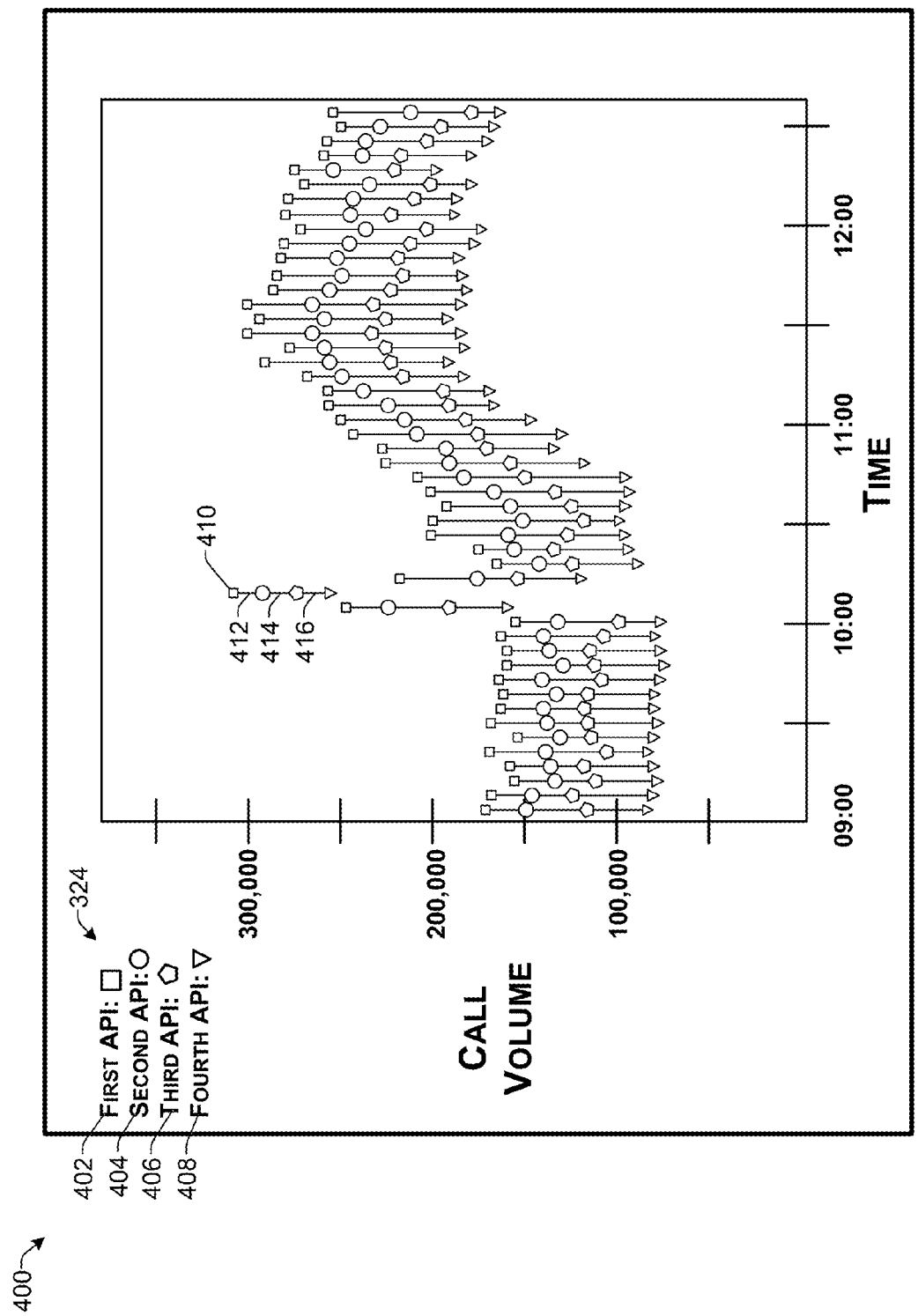
FIG. 4 illustrates a graphic example of using a service relationship model for monitoring aggregated log data of a service group according to some implementations.

FIG. 4 illustrates an example for discussion purposes of a graph 400 representing aggregation of call volume data for a service group 324 over time. The graph 400 maps data for a service group 324 that includes four APIs including a first API 402 having data points represented by squares, a second API 404 having data points represented by circles, a third API 406 having data points represented by pentagons, and a fourth API 408 having data points represented by inverted triangles. In this example, the first API 402 has spiked to almost double its previous value over the course of several minutes, as shown at by a spike 410. However, because the other APIs, 404, 406 and 408 have also increased by large amounts, the analysis component 306 may determine that the spike is a normal event driven by external traffic, and therefore, an alarm is not issued. For instance, in this example, the service relationship model 128 indicates that the four APIs 402, 404, 406 and 408 are interrelated in such a way that they follow each other in call volume within certain ranges 412, 414, 416. Consequently, the analysis module 306 determines that the spike 410 in the first API 402 also resulted in spikes in the other three APIs 404, 406 and 408, and accordingly, the likelihood that the spike 410 is cause for alarm is considered low.

Figure 5:
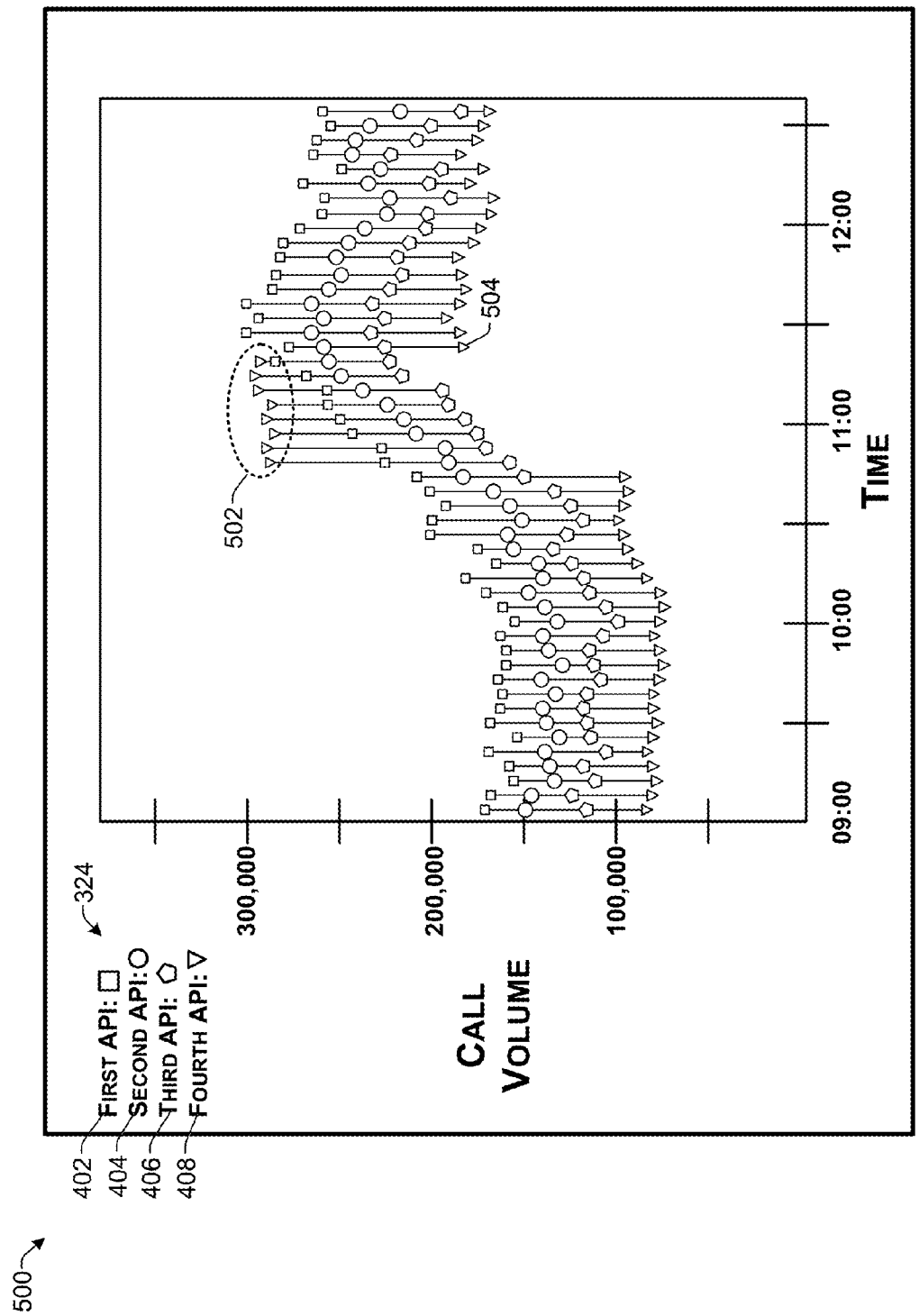
FIG. 5 illustrates a graphic example of using a service relationship model for monitoring aggregated log data of a service group according to some implementations.

FIG. 5 illustrates an example of a graph 500 that depicts a different scenario for the APIs 402-408 discussed in FIG. 4 above. In this example, as noted at area 502 on the graph 500, the fourth API 408 has increased in call volume substantially while the other APIs 402, 404, and 406 have only increased gradually over several intervals time. Accordingly, the analysis module 306 may determine that the fourth API 408 is not within the expected ranges indicated by the service relationship model 128 for this service group 324. Consequently, when the analysis module 306 makes this determination an alert may be provided to the administrator at the monitoring service 102, or at the service provider corresponding to the fourth API 408. For example, the analysis module 306 may generate an alert that is sent as electronic communication to an administrator at the monitoring service 102 or at the service provider 104 that provides the fourth API 408. The administrator may access the monitoring service interface 126 to take remedial action to address the anomaly in the fourth API 408.

For example, upon determining that an alert should be issued, the analysis module 306 may next examine the service consumers 106 that are accessing the fourth API 408 during the interval in question. For example, the aggregated log data 124 may provide information with the granularity of each call to each API by each service consumer, which enables the data aggregation module 304 to identify how many calls each service consumer makes to each API. Accordingly, the data aggregation module is able to isolate and identify the service consumers currently and recently calling the fourth API 408. The analysis module 306 may access this information to determine whether one or several of those service consumers are causing the spike at 502 and may include this information with the alert provided to the administrator. If a particular service consumer is causing the increased activity, the administrator may block the particular service consumer using a control in the user interface 126, as described additionally below. As another example, if a particular service consumer cannot be identified as the cause, the administrator may be able to take other remedial action to slow traffic to the API, if necessary. For example, if the service type is conducive, the administrator may use the user interface 126 to implement a captcha or security question that causes all service consumers to include human interaction when making requests to the fourth API 408. This type of remedial action may be effective during a denial of service attack, thereby slowing traffic to the fourth API 408, although this may not be practical for all types of services. However, numerous other options will be apparent to those of skill in the art in view of the disclosure herein. In the example of FIG. 5, following the remedial action, the traffic to the fourth API recedes to an expected level as indicated at 504.

Example Monitoring Framework

Figure 6:
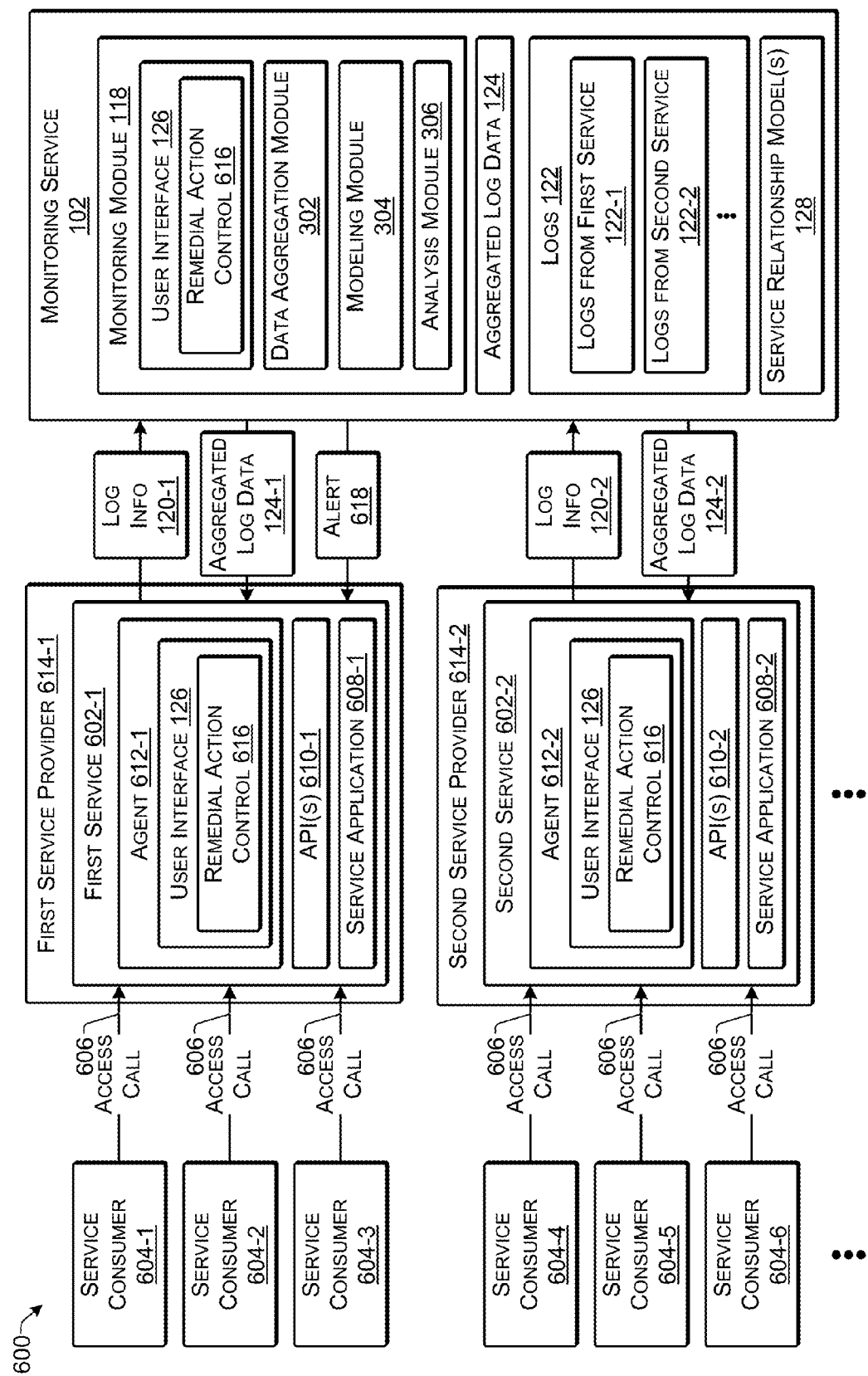
FIG. 6 illustrates an example framework for monitoring services and taking remedial action in response to an alert according to some implementations.

FIG. 6 illustrates an example framework 600 for monitoring services and service consumers, and for enabling remedial action in response to an alert according to some implementations. In this example, the monitoring service 102 is in communication with a plurality of services 602-1, 602-2, . . . , which are in communication with a plurality of service consumers 604-1 through 604-6, . . . , as described above. Accordingly, each service consumer 604 may submit one or more access calls 606 to obtain a desired service from one of the services 602. Each service 602 may include at least one service application 608 for providing the service and at least one API 610 for responding to the access calls 606 from the service consumers 604. As an example, in some implementations, the services 602 may require that the service consumers 604 use a secret key to sign the access calls 606, and each service 602 may also have a corresponding secret key that may be used to check that the access calls 606 are from authorized service consumers. In other implementations, secret keys are not used and the services may check the authorization of the service consumers 604 in other known manners, or not at all.

In some implementations, each service 602-1, 602-2 may include a respective agent 612-1, 612-2, such as a runtime client, that records the log information 120 and provides the log information 120 to the monitoring service 102. For example, the agent 612 for a service 602 may keep track of each access call 606 received by the service 602 from each service consumer 604, determine the response time to each access call 606, the API that was the subject of each access call 606, the information provided to a service consumer for each access call 606, and the like. In some instances, when each service provider 614 registers a service 602 with the monitoring service 102, or otherwise becomes a member of or subject to the monitoring service 102, the agent 612 may be provided to each service provider 614. For example, each service provider 614 may download the agent 612 from the monitoring service 102, or the like. In the illustrated example, the agent 612-1 provides log information 120-1 from the first service 602-1, while the agent 612-2 provides log information 120-2 from the second service 602-2.

Accordingly, each agent 612 on each service 602 may act independently to store log information 120 and periodically provide the log information 120 to the monitoring service 102 for storage in the logs 122. For example, the logs 122 may include separately stored logs for each separate service, such as logs from the first service 122-1, logs from the second service 122-2, and so forth. Furthermore, each agent 612 may provide an instance of the user interface 126 to an administrator at the service provider 614, which may provide the service provider 614 with the ability to view aggregated log data 124 pertaining to at least the corresponding the service of the service provider. For example, as the data aggregation module 302 aggregates the logs 122 to generate aggregated log data 124 the aggregated log data 124 may be provided to each service provider 614. In the illustrated example, aggregated log data 124-1 related to first service 602-1 is provided to the first service provider 614-1. Similarly, aggregated log data 124-2 related to the second service 602-2 is provided to the second service provider 614-2. Thus, administrators at each service provider 614 are able to view the aggregated log data 124 relating to their services 602. Further, in some implementations, administrators at the service providers may also be able to view the aggregated log data 124 of other services that are not their own.

In some implementations, the user interface 126 may provide a remedial action control 616 that may be implemented by an administrator to address abuse of service, security breaches, software glitches and/or system failures according to some implementations herein. For instance, it may happen that a service consumer 604 is exceeding an authorized usage quota set for a particular service 602. For example, when a service consumer 604 substantially exceeds an authorized usage quota, this can cause latency or service-interrupt problems at the service 602, denial of service to other service consumers 604, and the like. Accordingly, implementations herein may provide the remedial action control 616 with the capability to block access calls 606 of a particular service consumer 604 to one or more APIs 610 and/or service applications 608. For example, each instance of the user interface 126 may include the remedial action control 616, which may identify a particular API 610 and a particular service consumer 604 that may be blocked from accessing the particular API 610. In some instances, the user interface 126 may display each of the APIs and each of the service consumers to enable an administrator to select a particular service consumer to block from accessing one or more selected APIs.

As an example, suppose that service consumer 604-1 begins to make a large number of access calls 606 to the service 602-1. For instance, the service consumer 604-1 may be the subject of a security breach that causes the service consumer 604-1 to make an abnormally high number of access calls 606, or the service consumer 604-1 may have suffered a software glitch causing an abnormally high number of access calls 606. The service provider 614-1 for the service 602-1 may become aware of this situation in any of several manners, such as through monitoring the user interface 126, or by an alert 618 issued by the monitoring service 102 in view of the log information 120-1 received by the monitoring service 102 from the service 602-1. In response, an administrator at the service provider 614-1 may activate the remedial action control 616 to block access of the particular service consumer 604-1 to the API 610-1 and/or the service application 608-1. Additionally, because the blocking of a particular service consumer 604 may take place at a service or API level, when a service provider 614 provides multiple different services, the service provider may block access of the particular service consumer 604 to a particular service 608 or API 610, while still permitting access of this particular service consumer 604 to other services 608 or APIs 610 provided by the service provider or other service providers.

In other implementations, the remedial action control 616 may perform a different action than blocking access of one or more service consumers. For example, in some instances, the remedial action control 616 may instruct the service to pause for a predetermined period of time before responding to each request. Alternatively, the remedial action control 616 may instruct the service to error-out calls from one or more service consumers. For example, if a particular service consumer is noted to be 100 percent over the expected request rate allowed for that particular service consumer, the remedial action control 616 may be activated to error-out a certain percentage (e.g., 50 percent) of the calls received from that particular service consumer. As another example, activation of the remedial action control 616 may cause instructions to be sent to one or more of the registered service consumers requesting that the service consumers throttle their access calls to the service to a specified level or frequency. As yet another example, the remedial action control 616, when activated, may cause a captcha or security question to be activated in conjunction with a particular service. This option might be implemented when excessive traffic cannot be attributed to any particular service consumers and the service provider desires to slow down overall traffic for a service. Accordingly, by implementing a captcha or security question, it is possible to reduce the amount of traffic to a service because human interaction is required to make access calls to the service. However, this solution may work in only a limited number of service scenarios, as some types of services are not conducive to requiring human interaction, such as where the typical number of calls from each service consumer may number in multiple transactions per second, and the like.

Furthermore, an administrator at the monitoring service 102 may also be authorized to execute the remedial action control 616 at the monitoring service 102 when an alert is received for a particular service. For example, a command to block a particular service consumer may be transmitted from the user interface 126 at the monitoring service 102 to the agent 612-1 at the first service 602-1 for instructing the agent 612 to execute the blocking of the service consumer 604-1. Accordingly, implementations herein provide the service provider 614 and/or the monitoring service 102 with the ability to block an individual service consumer 604 at the host level, at the service application level, or at the API level, without blocking access of other service consumers 604 to the API 610-1 or the service application 608-1. Consequently, rather than resulting in a denial of service to all authorized service consumers 604, an unexpected or abnormally high number of access calls from a particular service consumer 604 can be curtailed without loss of service to the other service consumers 604. Further, in some implementations, the remedial action control 616 can be automated so as to act independently to block an offending service consumer 604 whenever the service consumer's peak access call rate exceeds the service consumer's established quota or a predetermined threshold, as established for example, by the service relationship models 128.

Furthermore, in some implementations, the monitoring service 102 may monitor the behavior of each service consumer 604 with respect to a particular service 602 to determine whether there are any anomalies, apparent improper use, unauthorized access calls, and so forth. For example, when the monitoring service 102 determines that there is an anomaly, the monitoring service 102 may send an alert to the corresponding service provider 614. Additionally, in some implementations, rather than the monitoring service 102 monitoring and reviewing the logs 122, the logs 122 and/or aggregated log data 124 for a particular service, or for all services, may be provided to an authorized third party to review the logs 122 and/or aggregated log data 124 for anomalies or other areas of concern.

Example User Interface

Figure 7:
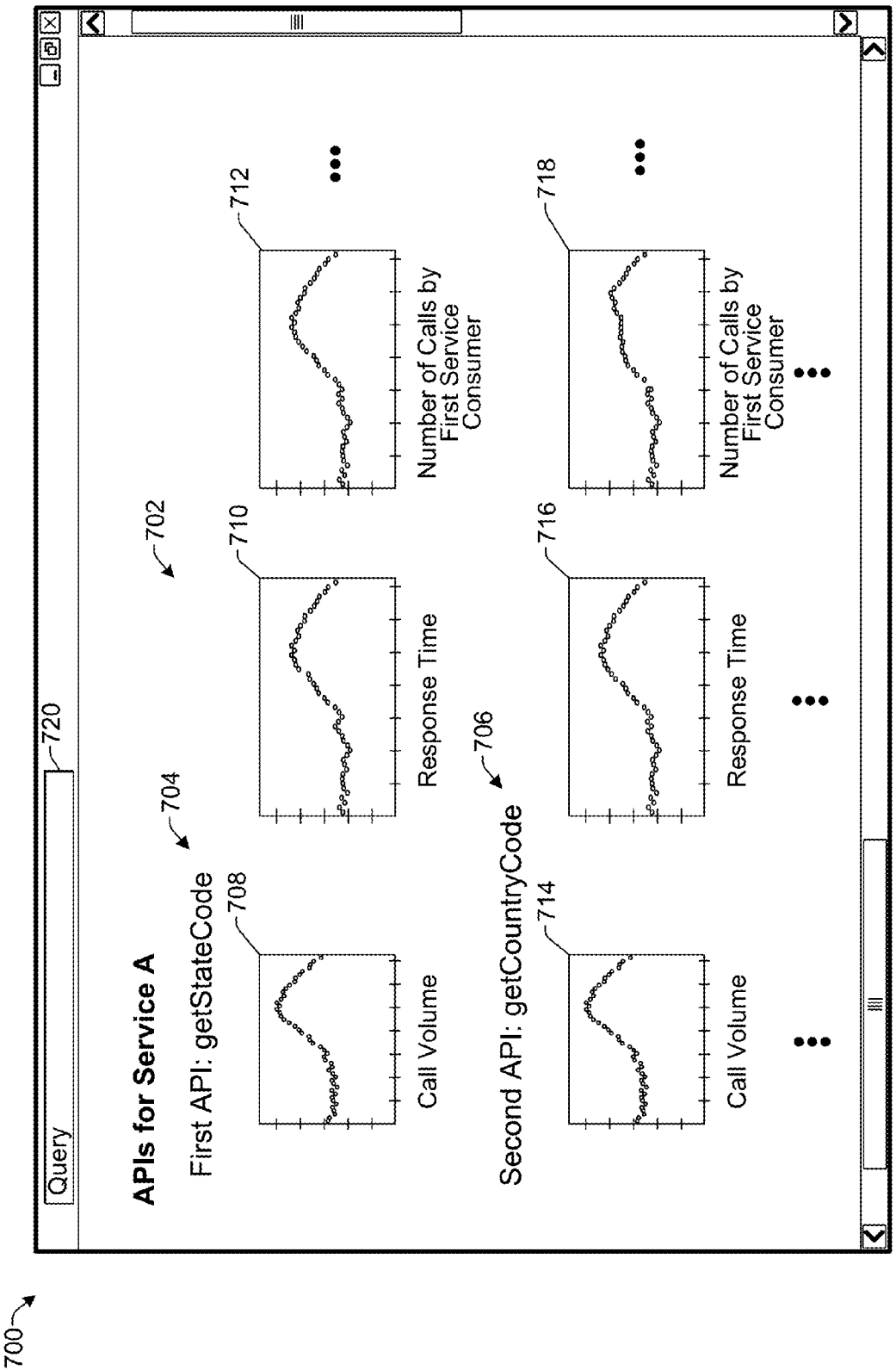
FIG. 7 illustrates an example of a portion of a monitoring service user interface according to some implementations.

FIG. 7 illustrates an example user interface portion 700 that an administrator at the monitoring service 102 or at a service provider 104 may use to monitor desired metrics related to one or more services or service consumers according to some implementations. The user interface portion 700 may correspond to part of the monitoring service user interface 126 discussed above with respect to FIGS. 1, 3 and 6. For example, the user interface portion 700 may be configured to display a large variety of information related to particular APIs, particular service consumers, and accesses to APIs or services by service consumers.

In the illustrated example, the user interface portion 700 is configured to display information on the granularity of individual APIs for a particular service A. In this example, the user interface portion 700 includes a list 702 of APIs for the service A including a first API 704, and a second API 706. For each API provided by the service A, the user interface portion 700 may display information such as call volume as a function of time 708, response time as a function of time 710, number of calls made over time by a first service consumer 712, and so forth. Similarly, for the second API 706 similar information may be displayed such as call volume as a function of time 714, response time as a function of time 716, number calls made over time by the first service consumer 718, and so forth. Further, the example information illustrated in FIG. 7 provides just several non-limiting examples of the large variety of aggregated information 124 that may be provided by the user interface 126. Numerous other types of information may be displayed, as described above.

Additionally, in some implementations, the user interface 126 may include other functionality to enable administrators at the monitoring service 102 and or service providers 104 to obtain desired information. In some implementations, the user interface 700 may include one or more a query boxes 720 that a user may employ to submit a query to obtain desired information. For example, the user interface 126 may accept information such as the name of an API or service and a first and second timestamp, as inputs may return, for example, the top K service consumers that used the service over the time period between the first time stamp and the second timestamp, which service consumers contributed to an overall service latency change over the time period, which service consumers contributed most to the call volume over the time period, or the like.

Additionally, the monitoring service 102 may provide history information regarding each service that subscribes to the monitoring, such as date at which the service was first added to the monitoring service, the date that a particular metric was added for a particular service, performance numbers for the particular service over the course of time since the service was added, and the like. Similarly, user interface 126 may provide views of particular service consumer metrics, such as a list of all services accessed by a particular service consumer, the total number of calls made by a particular service consumer to each service, the overall request rate for a particular service consumer to a single service, several services, or all services, and the like.

Accordingly, the user interface 126 and the user interface portion 700 may provide service providers with the ability to obtain a large amount of information regarding how their services are being used, who is using their services, and the like. For example, the user interface 126 enables the service provider to determine whether the service consumers are using their services correctly and efficiently. In addition, as mentioned above, the user interface 126 may enable service providers and/or the monitoring service 102 to restrict access of particular service consumers who violate access policies, usage quotas, or the like, such as when the service consumers exceed their maximum allowed call rate, or the like. The restriction of access may be executed at a granularity of restricting access of a particular service consumer at the service level and or an individual API level.

Furthermore, the monitoring service 102 may enable service providers to efficiently manage and monitor the service consumers that are authorized to access their services. For example, a service provider may view a history of who has accessed a particular service. Additionally, the monitoring service 102 may notify a service provider of abnormalities in service consumer call patterns, determine which service consumers have called which APIs, determine which service consumers no longer require access to particular APIs, allocate costs of operation back to particular service consumers, determine whether a particular service is meeting service level agreements for particular service consumers, and monitor other information that assists the service providers in the management and provision of their services.

Example Processes

Figure 8:
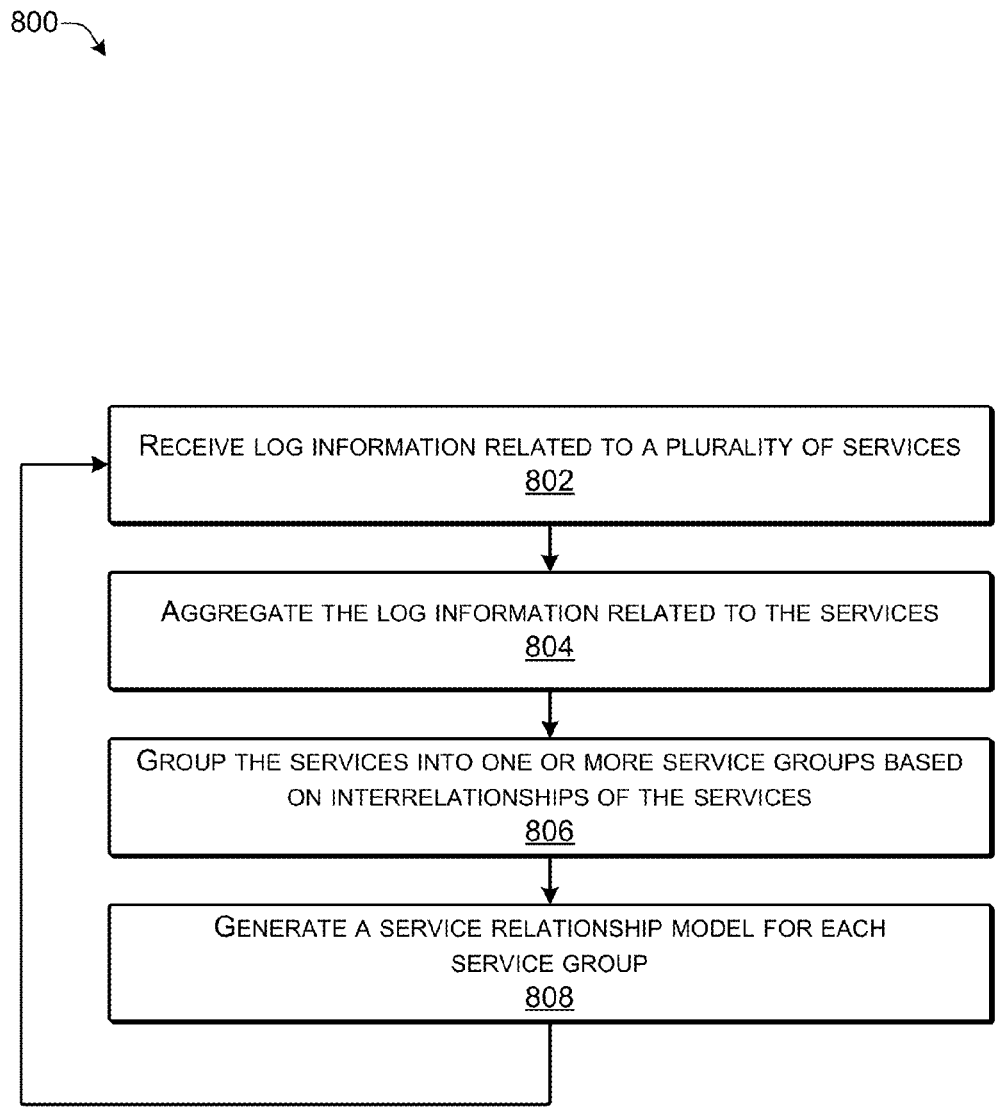
FIG. 8 is a flow diagram illustrating an example process for grouping services into one or more service groups and generating one or more service relationship models for monitoring the services according to some implementations.
Figure 9:
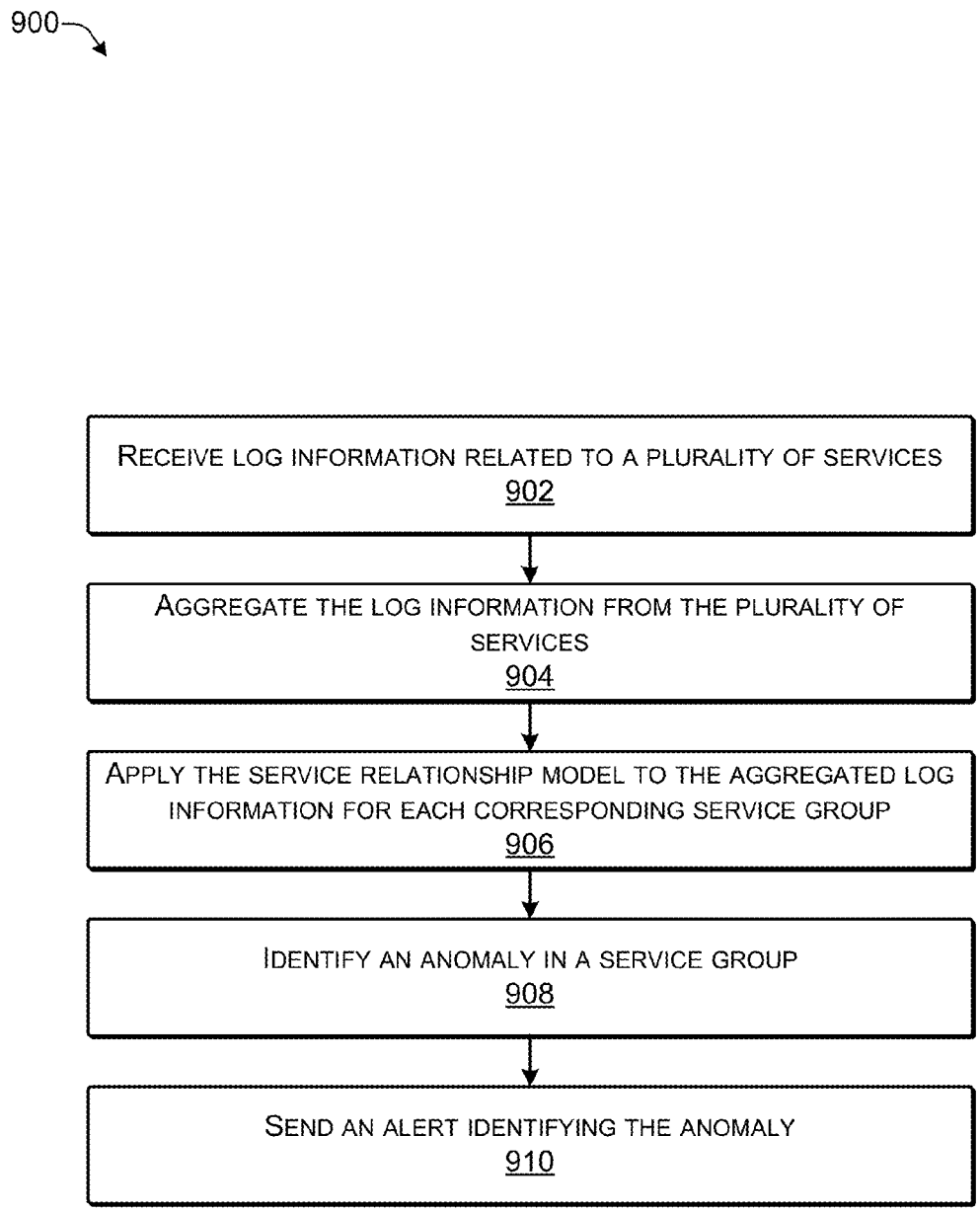
FIG. 9 is a flow diagram illustrating an example process for monitoring services and service consumers according to some implementations.

FIGS. 8 and 9 illustrate example processes for implementing the techniques described above for monitoring services and service consumers according to some implementations. These processes are illustrated as a collection of operations in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the frameworks, architectures and environments described in the examples herein, although the processes may be implemented in a wide variety of other architectures, frameworks or environments.

FIG. 8 is a flow diagram illustrating an example process 800 for identifying groups of interrelated services and generating a service relationship model for the identified groups according to some implementations herein.

At block 802, the monitoring service 102 receives log information related to a plurality of services. For example, the agent 612 at each service provider may collect log information regarding each access by a service consumer to the one or more services provided by the service provider. The agent may forward this log information to the monitoring service 102 as the log information is accumulated, or as a batch on a periodic basis. The log information may provide numerous details relating to the calls to each service (e.g., each API), such as total calls to a service, latency of each service, which service consumer has called which service, the frequency with which a service is called by each service consumer, and the like.

At block 804, the aggregation module 302 may aggregate the log information related to the plurality of services. For example, the aggregation module may cross-reference the log information from each of the plurality of services for determining various performance metrics related to the plurality of services, such as total call volume, response time or latency, average latency, average amount of data returned, and so forth. The aggregation module may also aggregate and cross reference the log information with respect to the service consumers to determine calls made by each service consumer to each service, rate at which the calls were made, time between making a call and receiving a response, and the like.

At block 806, the modeling module 304 may group the plurality of services into one or more service groups based on observed interrelationships between various different services. For example, the modeling module 304 may apply statistical analysis to identify those services (e.g., particular APIs) that demonstrate an interrelationship with one another for one or more performance metrics of interest, such as total call volume, latency, or the like.

At block 808, the modeling module 304 may generate a service relationship model 128 corresponding to each identified service group 324. For example, the modeling module 304 may generate a service relationship model for a corresponding service group, which predicts how each service in the service group will perform relative to the other services in the service group for the relative performance metric that interrelates the services in the service group. Various statistical modeling techniques may be used to generate the service relationship models 128, examples of which may include regression models, Markov chain models, hidden Markov models, Bayesian models, or the like. The service relationship model 128 for each service group 324 establishes statistical probabilities regarding predicted relative behaviors of members of the service group with respect to one another for one or more relative performance metrics. Following establishment of one or more service groups 324 and one or more corresponding relationship models 128 for the plurality of services, the process 800 may return to block 802. The process 800 may be repeated periodically to update the service groups 324 and/or the service relationship models 128 as existing services change and/or new services are added.

FIG. 9 is a flow diagram illustrating an example process 900 that may be performed by a service provider for monitoring services and service consumers according to some implementations.

At block 902, the monitoring service 102 receives log information related to a plurality of services. For example, the agent 612 at each service provider may collect log information regarding each access by a service consumer to the one or more services provided by the service provider. The agent may forward this log information to the monitoring service 102 as the log information is accumulated, or as a batch on a periodic basis. The log information may provide numerous details relating to the calls to each service (e.g., each API), such as total calls to a service, latency of each service, which service consumer has called which service, the frequency with which a service is called by each service consumer, and the like.

At block 904, the aggregation module 302 may aggregate the log information related to the plurality of services. For example, the aggregation module may cross-reference the log information from each of the plurality of services for determining various performance metrics related to the plurality of services, such as total call volume, response time or latency, average latency, average amount of data returned, and so forth. The aggregation module 302 may also aggregate and cross reference the log information with respect to the service consumers to determine calls made by each service consumer to each service, rate at which the calls were made, time between making a call and receiving a response, and the like.

At block 906, the analysis component 306 may apply one or more service relationship models 128 to the aggregated log data for each corresponding service group. For example, the aggregated log data may be aggregated according to the service groups 324 into a suitable data structure such as a graph, matrix or the like. The analysis component 306 may then examine the behavior of each service that is a member of a particular service group 324 to determine whether the behavior of each service in the particular service group conforms to the expected behavior, as predicted by the corresponding service relationship model 128 for that particular service group 324.

At block 908, when the analysis component 306 detects that one or more of the services in a particular service group are not behaving in a manner that corresponds to the service relationship model 128 for the particular service group, the analysis component 306 may identify the actions of one or more of the services in the particular service group as an anomaly.

At block 910, in response to identifying an anomaly in a service group, the analysis component 306 may provide an alert to an administrator at the monitoring service, at the service provider, or the like. For example, in some implementations, the alert may be provided to the service provider, and an administrator at the service provider may take appropriate remedial action in response, such as blocking access of a particular client, slowing traffic to the service, or the like. However, in other implementations, the alert may be provided to an administrator at the monitoring service and the administrator at the monitoring service may take remedial action, such as blocking access of a particular client, slowing traffic to the service, or the like. Furthermore, in some implementations, the analysis component 306 may also determine which service consumer is a top contributor to the anomaly noted in the particular service, and provide this information with the alert.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments, implementations herein are not limited to the particular examples shown and discussed.

Example Computing Devices

Figure 10:
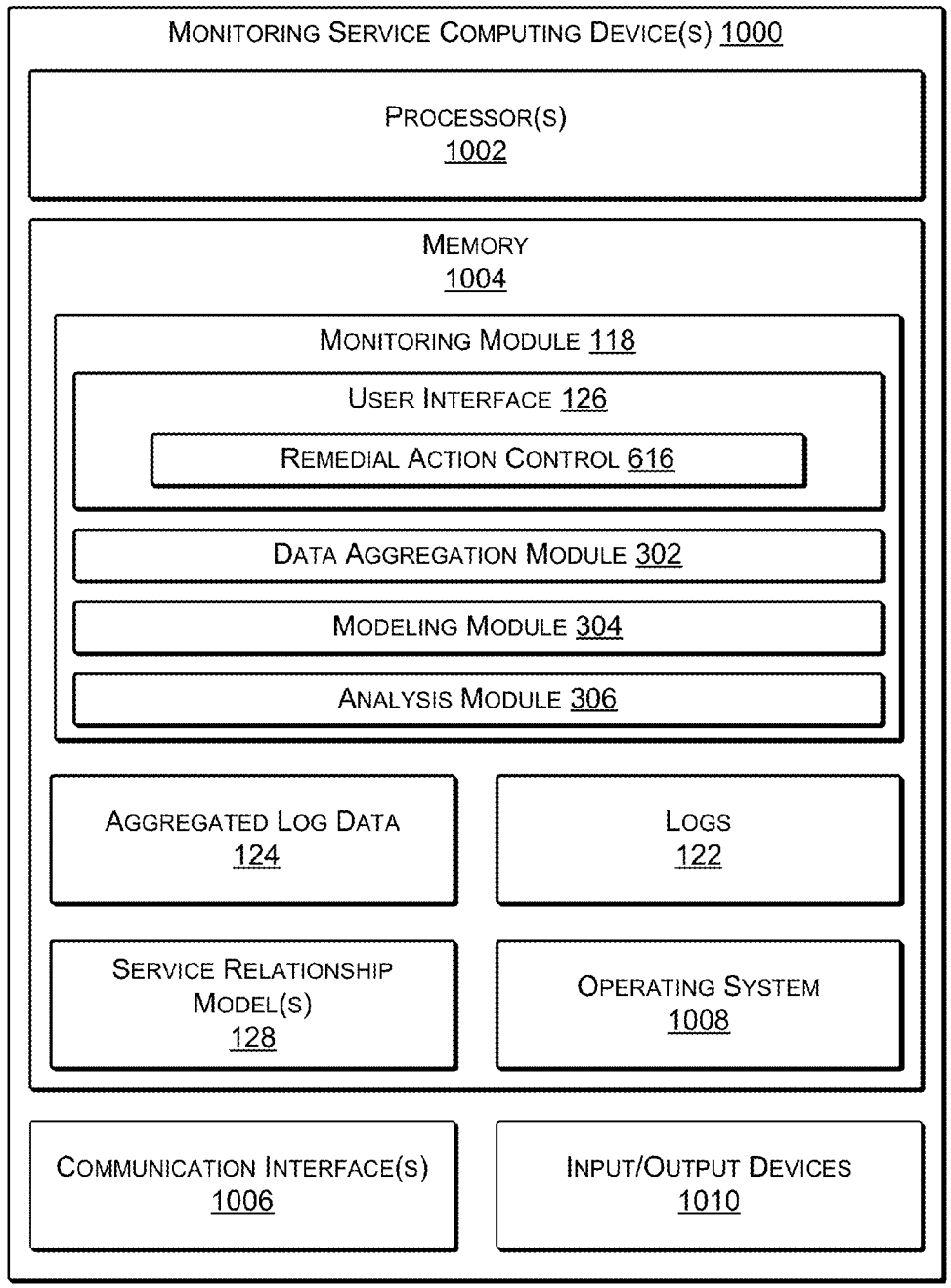
FIG. 10 illustrates select components of an example monitoring service computing device according to some implementations.

FIG. 10 illustrates select components of one or more monitoring service computing devices 1000 that may be used to implement the functionality of the monitoring service 102 according to some implementations. For example, the monitoring service 102 may be hosted on servers or on one or more other types of computing devices that may be embodied in any number of ways. For instance, in the case of a server, the monitoring service 102 may be implemented on a single server, a cluster of servers, a server farm or data center, and so forth, although other computer architectures (e.g., a mainframe architecture) may also be used. Further, while the figures illustrate the components of the monitoring service 102 as being present in a single location, it is to be appreciated that these components may be distributed across different computing devices and locations in any manner. Generally, the monitoring service 102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

In the illustrated example, the monitoring service computing device 1000 includes one or more processors 1002, a memory 1004, and one or more communication interfaces 1006. The memory 1004 may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, storage arrays, or any other medium which can be used to store the desired information and which can be accessed by a computing device. Depending on the configuration of the computing device 1000, the memory 1004 may be a type of computer readable storage media and may be a non-transitory storage media.

The memory 1004 may be used to store any number of functional components that are executable by the processors 1002. In many implementations, these functional components comprise instructions or programs that are executable by the processors 1002 and that, when executed, implement operational logic for performing the actions attributed above to the monitoring service 102. Functional components stored in the memory 1004 may include the monitoring module 118 as described above, which may be executed on the processors 1002 for implementing the various functions and features of the monitoring service 102 described herein. In some implementations, the monitoring module 118 may include the data aggregation module 302, the modeling module 304, and the analysis module 306, as described above. Other components included in the monitoring module 118 may include the user interface 126 and the remedial action control 616, described above. Additional functional components stored in the memory 1004 may include an operating system 1008 for controlling and managing various functions of the monitoring service computing device 1000. The memory 1004 may also store the aggregated blog data 124, the service relationship models 128, and the logs 122. The computing device 1000 may also include many other logical, programmatic and physical components, of which those described above are merely examples that are related to the discussion herein. Furthermore, while multiple modules have been described for performing various functions for convenience of discussion in some implementations, in other implementations, a single module may perform all the functions described herein, or multiple different modules may perform some or all of the functions described herein.

The communication interface(s) 1006 may include one or more interfaces and hardware components for enabling communication with various other devices, such as service provider computing devices, service consumer computing devices, and/or user devices over communication links 130-134. For example, communication interface(s) 1006 may facilitate communication through one or more of the Internet, cable networks, cellular networks, wireless networks (e.g., Wi-Fi, cellular) and wired networks. Various different approaches to implementations described herein can be implemented in various environments. For example, the communication links 130-134 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

Monitoring service computing device 1000 may further be equipped with various input/output devices 1010. Such devices may include a display, various user interface controls (e.g., buttons, joystick, keyboard, touch screen, etc.), audio speakers, connection ports and so forth.

Figure 11:
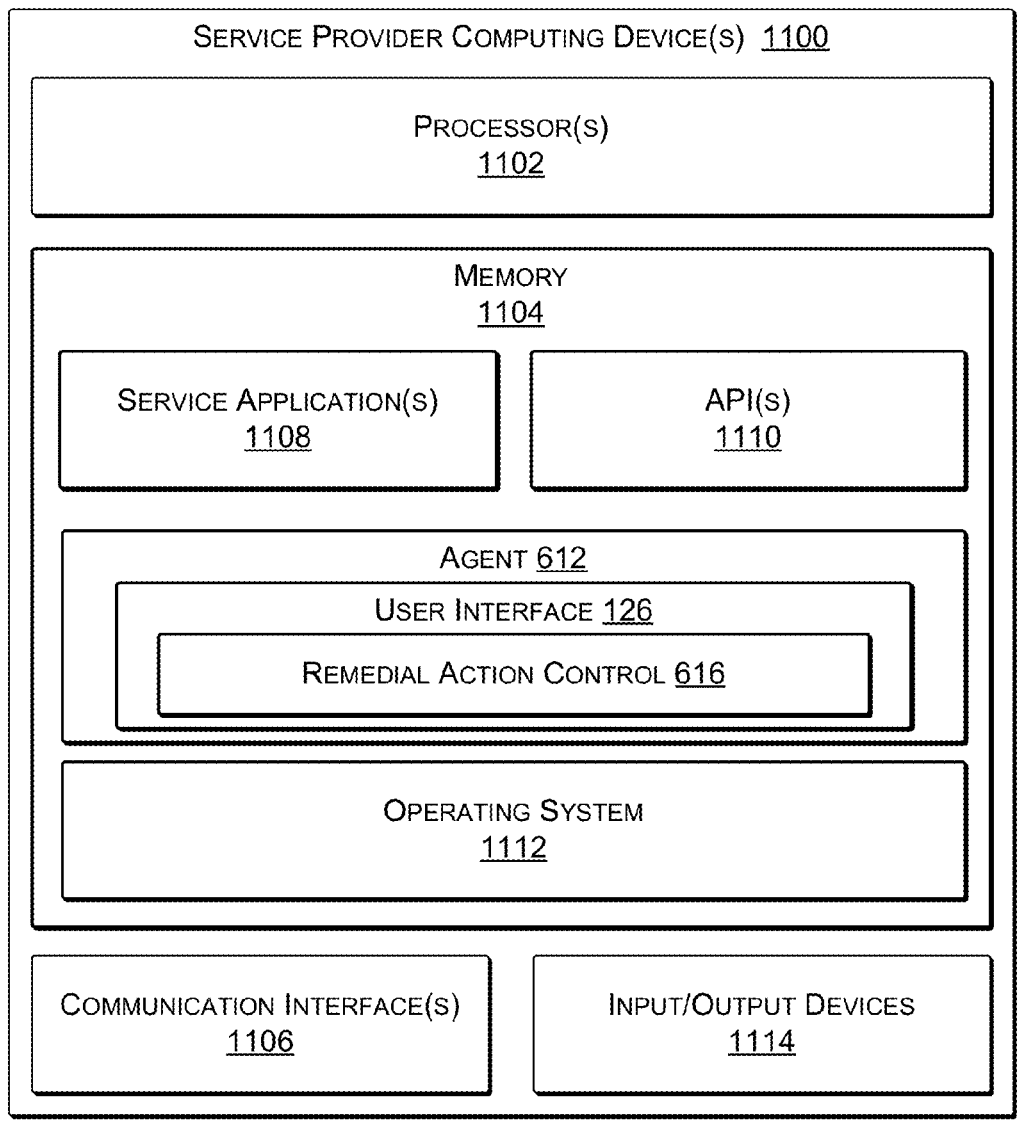
FIG. 11 illustrates select components of an example service provider computing device according to some implementations.

FIG. 11 illustrates select components of one or more service provider computing devices 1100 that may be used to implement the functionality of the service providers described herein according to some implementations. Additionally, in some implementations, the service consumer computing devices may be structurally similar, while containing different functional components. Further, as mentioned previously, a service provider for a first service may itself be a service consumer of a second service. In the illustrated example, the service provider computing device 1100 includes one or more processors 1102, a memory 1104 and one or more communication interfaces 1106. The processors 1102 and the memory 1104 may be any of the types of processors and memory described above with respect to processors 1002 and memory 1004, respectively.

The memory 1104 may be used to store any number of functional components that are executable on the processors 1102. In many implementations, these functional components comprise instructions or programs that are executable by the processors 1102 and that implement operational logic for performing the actions attributed above to the service providers. In addition, the memory 1104 may store various types of data that are referenced by the executable components.

The memory 1104 may store one or more service applications 1108 and one or more APIs 1110, which may be executed on the processors 1102 to provide one or more services, as discussed above. The memory 1104 may also store the agent 612, including an instance of the user interface 126 and the remedial action control 616, as described above. Memory 1104 may also store an operating system 1112 that may manage and coordinate the various functions of the service provider computing device 1100.

The communication interface(s) 1106 may include one or more interfaces and hardware components for enabling communication with various other devices, such as service provider computing devices, service consumer computing devices, and/or user devices over communication links 130-134. For example, communication interface(s) 1106 may facilitate communication through one or more of the Internet, cable networks, cellular networks, wireless networks (e.g., Wi-Fi, cellular) and wired networks.

The service provider computing device 1100 may further be equipped with various input/output devices 1114. Such devices may include a display and various user interface controls (e.g., buttons, joystick, keyboard, touch screen, etc.), audio speakers, connection ports and so forth.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more computer-readable media storing computer-executable instructions that, when executed, cause one or more processors to perform operations comprising:
   receiving from a plurality of service providers, service consumer access information relating to service consumer calls made during a first period of time to a plurality of application programming interfaces (APIs) provided by the plurality of service providers;
   grouping the APIs into one or more service groups based, at least in part, on determining that the APIs in each service group have at least one performance metric that is interrelated to the at least one performance metric of other APIs that are members of the service group;
   generating a service relationship model for each service group based, at least in part, on observed behavior of the members of the service group with respect to one another for the at least one performance metric, the service relationship model predicting relative behaviors of members of the service group with respect to one another for the at least one performance metric;
   receiving from a plurality of service providers, service consumer access information relating to service consumer calls made over a subsequent period of time to the APIs provided by the service providers; and
   monitoring performance of the APIs based, at least in part, on the one or more service groups and the service relationship model for each service group.

2. The one or more computer-readable media as recited in claim 1, wherein the at least one performance metric comprises at least one of:
   call volume of each API in the service group as a function of time; or
   latency of each API in the service group as a function of time.

3. The one or more computer-readable media as recited in claim 1, the operations further comprising:
   determining that a first value related to the at least one performance metric for a first API in a first service group has changed;
   determining that a second value related to the at least one performance metric for a second API in the first service group has not changed in a manner predicted by the service relationship model for the first service group; and
   generating an alert based, at least in part, on failure of the APIs in the first service group to behave in accordance with the service relationship model for the first service group.

4. The one or more computer-readable media as recited in claim 1, the operations further comprising:
   providing an agent to each service provider of the plurality of service providers; and
   receiving, from the agents, log information relating to the service consumer calls to one or more of the APIs provided by each service provider.

5. The one or more computer-readable media as recited in claim 4, the operations further comprising aggregating the log information received from the agents at periodic intervals to determine for a particular interval a plurality of the performance metrics related to the service consumer calls to the plurality of APIs provided by the plurality of service providers.

6. A method comprising:
   grouping, by a computing device, based at least in part on performance information received over a first period of time, services of a plurality of services into one or more service groups, wherein individual service groups comprise a subset of the services determined to be interrelated with respect to a corresponding performance metric; and
   monitoring, over a second period of time, performance of the services within a particular one of the service groups with respect to other services in the particular service group for the corresponding performance metric.

7. The method as recited in claim 6, further comprising:
   generating a service relationship model corresponding to the particular service group, the service relationship model predicting relative behaviors of members of the particular service group with respect to one another for the performance metric; and
   applying the service relationship model for the particular service group when monitoring the behavior of the services in the particular service group.

8. The method as recited in claim 6, wherein the performance metric is a volume of calls received by individual services from service consumers.

9. The method as recited in claim 6, wherein the performance metric is a response time for responding to calls received by individual services from service consumers.

10. The method as recited in claim 6, further comprising:
    receiving, from the plurality of services, log information relating to service consumer calls to the plurality of services; and
    aggregating the log information at periodic intervals to generate aggregated log information for the plurality of services, the aggregated log information including the performance metric for the plurality of services, the performance metric related to the service consumer calls to the plurality of services.

11. The method as recited in claim 10, further comprising determining from the aggregated log information which service consumer of a plurality of service consumers is a top contributor to the performance metric.

12. The method as recited in claim 10, further comprising displaying at least a portion of the aggregated log information in a user interface.

13. The method as recited in claim 6, further comprising generating an alert based, at least in part, on failure of the services in the particular service group to behave with respect to one another in accordance with a prediction of behavior for the services in the particular service group.

14. The method as recited in claim 13, further comprising:
    identifying a service consumer that is a cause, at least in part, of failure of the services in the particular service group to behave in accordance with the prediction; and
    blocking access of the service consumer to at least one service in the particular service group.

15. The method as recited in claim 13, further comprising:
determining that a particular service of the services in the particular service group is a cause, at least in part, of failure of the services in the particular service group to behave in accordance with the prediction; and
slowing access of one or more service consumers to the particular service.

16. One or more computing devices comprising:
one or more processors;
one or more computer-readable media coupled to the one or more processors;
one or more modules maintained on the one or more computer-readable media and which, when executed by the one or more processors, cause the one or more processors to:
receive, over a first period of time, log information related to calls made by service consumers to a plurality of services;
identify, based at least in part on the log information, a plurality of service groups, wherein individual ones of the service groups include a respective subset of the services, wherein the services in a particular subset are determined to have a performance-related interrelationship with one another based, at least in part, on at least one performance metric; and
monitor, over a second period of time, relative performance of the services within the particular subset of the services corresponding to a respective one of the service groups.

17. The one or more computing devices as recited in claim 16, wherein the one or more modules are further executed to generate a service relationship model corresponding to the respective service group of the plurality of service groups, the service relationship model predicting behavior of the subset of the services in the corresponding respective service group with respect to one another for the at least one performance metric.

18. The one or more computing devices as recited in claim 17, wherein the one or more modules are further executed to periodically update at least one of the plurality of service groups or the corresponding service relationship model as services are changed or new services are added to the plurality of services.

19. The one or more computing devices as recited in claim 17, wherein the one or more modules are further executed to identify an anomaly in the calls to a particular service based, at least in part, on determining that behavior of the particular service is not in accordance with the service relationship model for the service group including the particular service.

20. The one or more computing devices as recited in claim 19, wherein the one or more modules are further executed to identify a particular service consumer as a top contributor to the anomaly.

21. The one or more computing devices as recited in claim 20, further comprising a user interface maintained on the computer-readable media and executed on the one or more processors to provide a remedial action control for blocking access of the particular service consumer to the particular service.

* * * * *